United States Patent
Marriott et al.

(10) Patent No.: US 8,123,293 B2
(45) Date of Patent: Feb. 28, 2012

(54) SEAT ASSEMBLY WITH ROTATABLE SEAT BOTTOM

(75) Inventors: Brandon S. Marriott, Greensboro, NC (US); Bradley M. Glance, Dexter, MI (US)

(73) Assignee: Syntec Seating Solutions LLC, Sterling Heights, MI (US)

( * ) Notice: Subject to any disclaimer, the term of this patent is extended or adjusted under 35 U.S.C. 154(b) by 133 days.

(21) Appl. No.: 12/637,176

(22) Filed: Dec. 14, 2009

(65) Prior Publication Data
US 2010/0148547 A1    Jun. 17, 2010

Related U.S. Application Data

(60) Provisional application No. 61/122,462, filed on Dec. 15, 2008.

(51) Int. Cl.
| B60N 2/02 | (2006.01) |
| B60N 2/20 | (2006.01) |
| B60N 2/30 | (2006.01) |
| B60N 2/42 | (2006.01) |
| B60N 2/427 | (2006.01) |

(52) U.S. Cl. .................................. 297/216.13; 297/331
(58) Field of Classification Search .............. 297/216.13, 297/331
See application file for complete search history.

(56) References Cited

U.S. PATENT DOCUMENTS

| 1,467,582 | A | * | 9/1923 | Lang .............................. 297/331 |
| 2,682,931 | A | | 7/1954 | Young |
| 3,287,061 | A | | 11/1966 | Nicholas |
| 3,385,633 | A | | 5/1968 | Aizley |
| 3,734,562 | A | | 5/1973 | Fourrey |
| 3,768,862 | A | | 10/1973 | Williams, Jr. |
| 3,832,002 | A | | 8/1974 | Eggert, Jr. et al. |
| 4,145,081 | A | | 3/1979 | Withers |
| 4,218,091 | A | | 8/1980 | Webster |
| 4,225,178 | A | | 9/1980 | Takada |
| 4,533,110 | A | | 8/1985 | Hill |
| 4,810,037 | A | | 3/1989 | Takagi |
| 4,919,488 | A | | 4/1990 | Deegener et al. |
| 5,009,469 | A | | 4/1991 | Mouri |
| 5,044,695 | A | | 9/1991 | Tsuchiya |

(Continued)

FOREIGN PATENT DOCUMENTS
FR          2658459 A1    8/1991

(Continued)

OTHER PUBLICATIONS

U.S. Appl. No. 12/637,270; Inventor: Brandon S. Marriott, filed Dec. 14, 2009, 47 pages.

(Continued)

*Primary Examiner* — Rodney B White
(74) *Attorney, Agent, or Firm* — Howard & Howard Attorneys PLLC

(57) ABSTRACT

A seat assembly for a vehicle comprises a pedestal for mounting to the vehicle. A seat bottom is coupled to the pedestal and is rotatable about a first axis between a seating position and a stowed position. A seat back is coupled to the pedestal and is rotatable about a second axis spaced from the first axis from an upright position to a forward position in response to a predetermined force from behind the seat back. A deformable extension is fixed to and extends between the seat back and the pedestal. The deformable extension is configured to deform to absorb energy when the seat back rotates from the upright position to the forward position.

24 Claims, 12 Drawing Sheets

U.S. PATENT DOCUMENTS

| | | | |
|---|---|---|---|
| 5,066,043 A | 11/1991 | Tokugawa | |
| 5,088,794 A | 2/1992 | Iwami et al. | |
| 5,139,311 A | 8/1992 | Imai et al. | |
| 5,219,202 A | 6/1993 | Rink et al. | |
| 5,253,924 A | 10/1993 | Glance | |
| 5,290,089 A | 3/1994 | Oleszko et al. | |
| 5,318,341 A | 6/1994 | Griswold et al. | |
| 5,320,411 A | 6/1994 | Sera | |
| 5,328,249 A | 7/1994 | Ball | |
| 5,340,185 A | 8/1994 | Vollmer | |
| 5,364,170 A | 11/1994 | West | |
| 5,366,268 A | 11/1994 | Miller et al. | |
| 5,462,332 A | 10/1995 | Payne et al. | |
| 5,575,533 A | 11/1996 | Glance | |
| 5,641,198 A | 6/1997 | Steffens, Jr. | |
| 5,722,731 A | 3/1998 | Chang | |
| 5,971,490 A | 10/1999 | Chang | |
| 6,022,074 A | 2/2000 | Swedenkleff | |
| 6,074,004 A | 6/2000 | Carmichael | |
| 6,113,185 A | 9/2000 | Yamaguchi et al. | |
| 6,123,388 A * | 9/2000 | Vits et al. | 297/216.13 |
| 6,164,720 A | 12/2000 | Haglund | |
| 6,217,068 B1 | 4/2001 | Tranium et al. | |
| 6,312,056 B1 | 11/2001 | Murphy et al. | |
| 6,328,386 B1 | 12/2001 | Good | |
| 6,412,876 B2 | 7/2002 | Nishide | |
| 6,485,098 B1 | 11/2002 | Vits et al. | |
| 6,508,515 B2 * | 1/2003 | Vits et al. | 297/216.13 X |
| 6,554,356 B1 | 4/2003 | Crose | |
| 6,604,599 B2 | 8/2003 | Yamaguchi et al. | |
| 6,648,409 B1 | 11/2003 | Laporte | |
| 6,666,520 B2 * | 12/2003 | Murphy et al. | 297/216.13 X |
| 6,676,219 B1 | 1/2004 | Brewer | |
| 6,688,685 B2 | 2/2004 | Kain | |
| 6,709,053 B1 | 3/2004 | Humer et al. | |
| 6,739,673 B2 | 5/2004 | Gupta et al. | |
| 6,779,841 B2 | 8/2004 | Eckendorff | |
| 6,811,186 B1 | 11/2004 | Fraley et al. | |
| 6,817,672 B2 | 11/2004 | Matsunuma | |
| 6,837,540 B2 | 1/2005 | Yamaguchi et al. | |
| 6,886,889 B2 | 5/2005 | Vits et al. | |
| 6,908,149 B1 | 6/2005 | Yamaguchi et al. | |
| 6,938,959 B1 | 9/2005 | Borunda et al. | |
| 6,953,223 B2 * | 10/2005 | Nelson et al. | 297/216.13 |
| 6,991,286 B2 | 1/2006 | Nelson et al. | |
| 7,000,994 B2 | 2/2006 | Leighton | |
| 7,029,067 B2 | 4/2006 | Vits et al. | |
| 7,040,696 B2 | 5/2006 | Vits et al. | |
| 7,055,901 B2 * | 6/2006 | Graham et al. | 297/216.13 |
| 7,055,905 B2 | 6/2006 | Spey et al. | |
| 7,059,675 B2 | 6/2006 | Nelson et al. | |
| 7,063,389 B2 | 6/2006 | Kennedy, Sr. | |
| 7,131,668 B2 | 11/2006 | Go | |
| 7,195,316 B2 | 3/2007 | Shimaski et al. | |
| 7,229,135 B2 | 6/2007 | Hyatt et al. | |
| 7,338,119 B2 | 3/2008 | Burch | |
| 7,354,105 B2 | 4/2008 | Nelson et al. | |
| 7,500,722 B2 | 3/2009 | Morris | |
| 7,784,867 B2 | 8/2010 | Lamparter | |
| 7,789,460 B2 | 9/2010 | Lamparter et al. | |
| 7,896,434 B2 * | 3/2011 | Lamparter et al. | 297/216.13 |
| 2002/0079734 A1 | 6/2002 | Murphy et al. | |
| 2004/0004381 A1 | 1/2004 | Timon | |
| 2004/0183344 A1 | 9/2004 | Glance et al. | |
| 2005/0168041 A1 | 8/2005 | Glance et al. | |
| 2005/0184577 A1 | 8/2005 | Nelson et al. | |
| 2005/0189800 A1 | 9/2005 | Nelson et al. | |
| 2005/0189801 A1 | 9/2005 | Mattes et al. | |
| 2005/0189802 A1 | 9/2005 | Mattes et al. | |
| 2005/0200172 A1 | 9/2005 | Graham et al. | |
| 2005/0206150 A1 | 9/2005 | Yamaguchi et al. | |
| 2006/0267390 A1 | 11/2006 | Epaud | |
| 2007/0035166 A1 * | 2/2007 | Summerford | 297/331 |
| 2008/0191540 A1 | 8/2008 | Morris | |
| 2008/0211275 A1 | 9/2008 | Lamparter et al. | |
| 2009/0072608 A1 | 3/2009 | Marriott et al. | |
| 2010/0052378 A1 | 3/2010 | Marriott et al. | |
| 2011/0140488 A1 * | 6/2011 | Marriott et al. | 297/216.13 |
| 2011/0148158 A1 * | 6/2011 | Lamparter et al. | 297/216.13 |

FOREIGN PATENT DOCUMENTS

WO  2008/027832 A2  3/2008

OTHER PUBLICATIONS

U.S. Appl. No. 12/875,429; Inventor: Ronald C. Lamparter, filed Sep. 3, 2010, 40 pages.

* cited by examiner

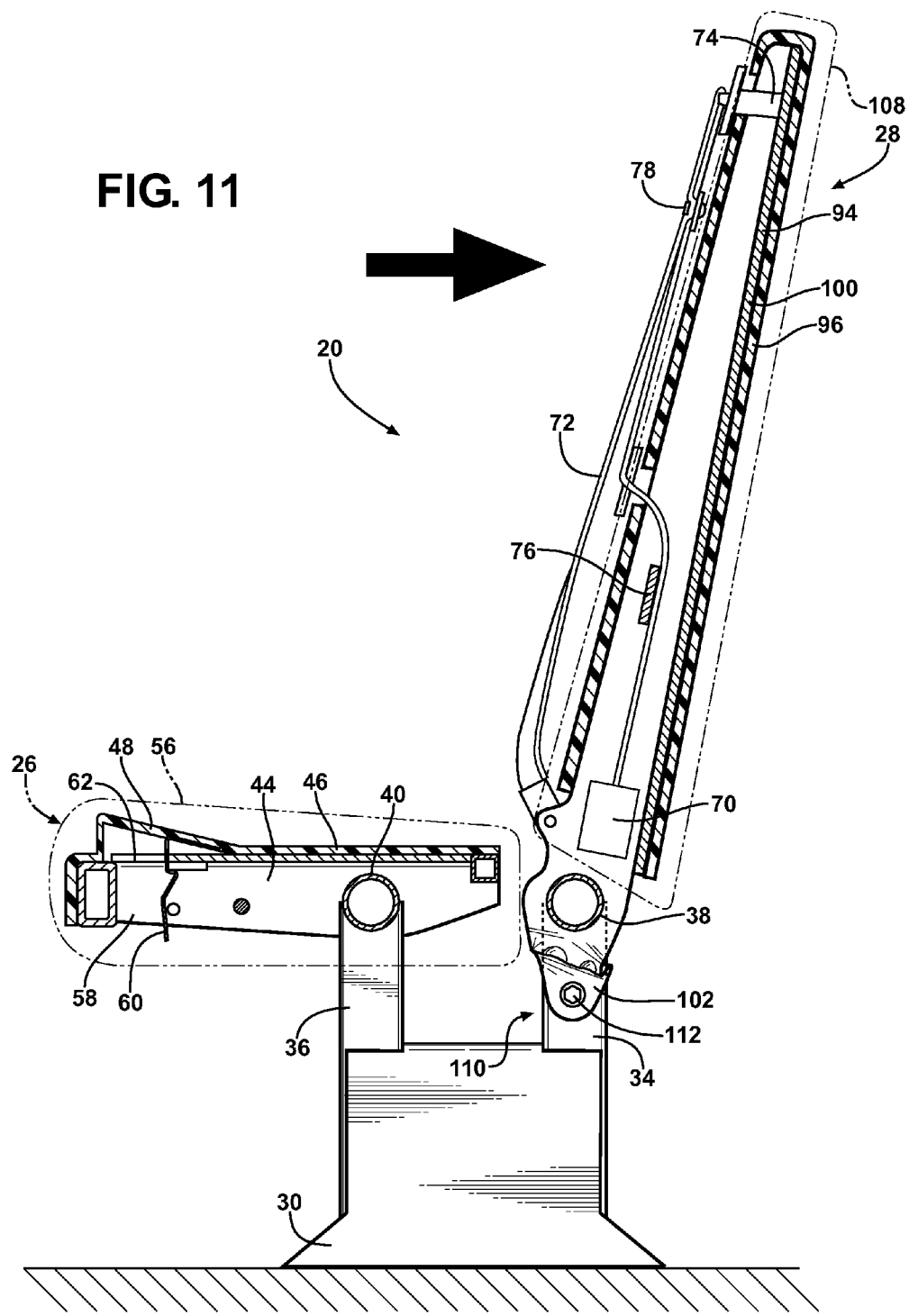

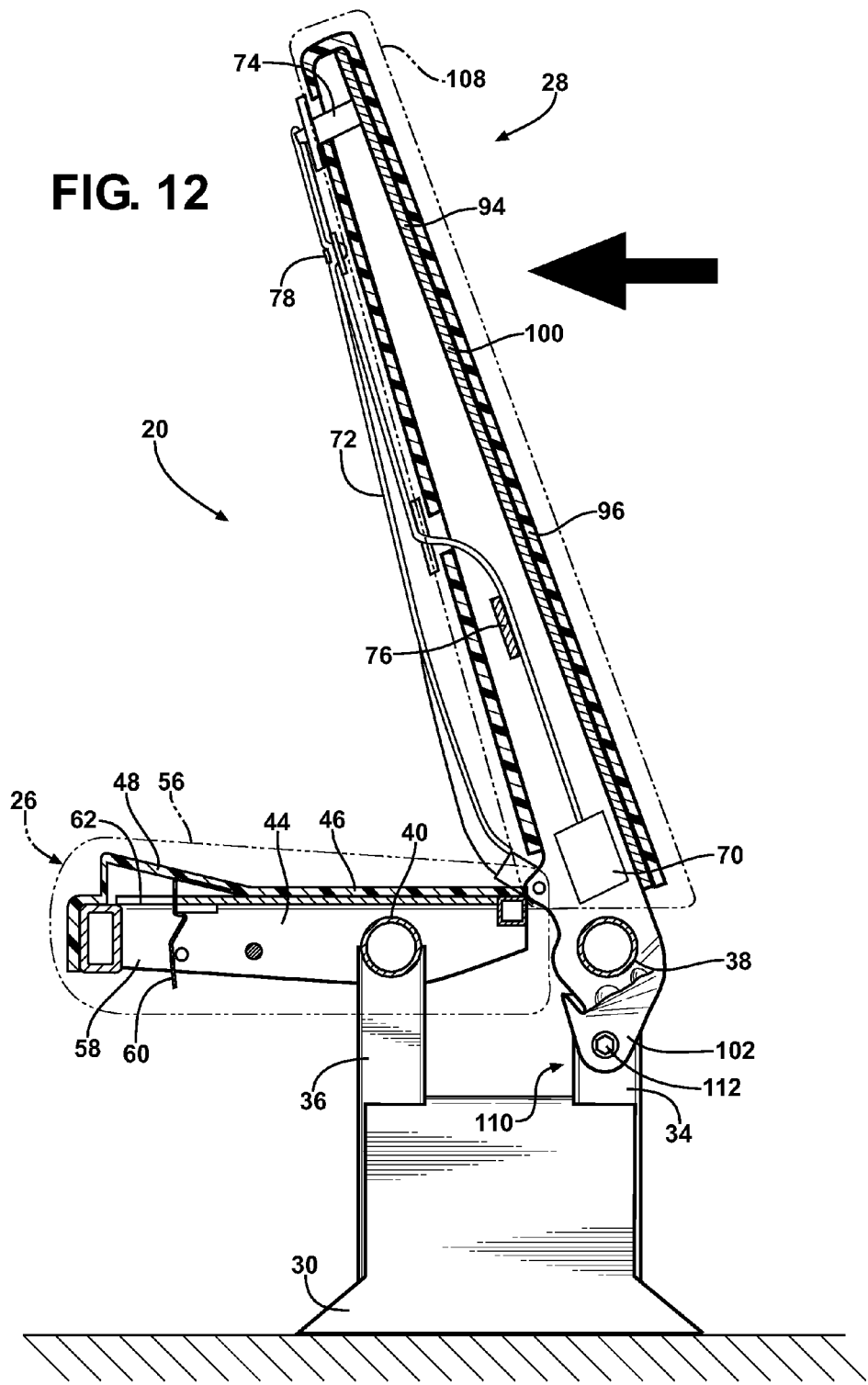

SEAT ASSEMBLY WITH ROTATABLE SEAT BOTTOM

CROSS-REFERENCE TO RELATED APPLICATIONS

The subject patent application claims priority to and all the benefits of U.S. Provisional Patent Application Ser. No. 61/122,462 which was filed on Dec. 15, 2008, the entire specification of which is expressly incorporated herein by reference.

BACKGROUND OF THE INVENTION

1. Field of the Invention

The subject invention generally relates to a seat assembly for a vehicle, and more specifically to a seat assembly including a rotatable seat bottom and a seat back that can rotate to absorb energy.

2. Description of the Related Art

School buses include a seat assembly for transporting occupants and, more specifically, school buses incorporate several seat assemblies into the school bus in rows. The seat assembly includes a seat bottom extending generally horizontally and a seat back coupled to the seat bottom and extending generally vertically relative to the seat bottom. Typically, the occupants are free to move about the school bus without being restrained in the seat assembly. In other words, the occupants are not buckled into seat belts to restrain movement of the occupants.

Seat assemblies are currently regulated by safety requirements, such as the National Highway Transportation Safety Administration's (NHTSA) Federal Motor Vehicle Safety Standards (FMVSS). For example, FMVSS 222, require that the seat back collapses, i.e., rotates from an upright position forward or rearward, to absorb energy from an occupant during a crash of the vehicle to reduce impact between the occupant and the seat back. As another example, Further, FMVSS 217 requires that seat assemblies adjacent an auxiliary exit door are required to have seat cushions that automatically flip up when not in use so that a clear aisle to the auxiliary exit door exists.

When a bus not equipped with seat belts is abruptly stopped, such as during a collision, unbelted occupants typically uncontrollably move under their own momentum relative to the seat assembly. For this reason, FMVSS 222 requires that during a front-end collision, the seat back typically folds forward when the occupant uncontrollably moves forward and hits the seat back such that the seat assembly absorbs energy from the uncontrollably moving occupant. Such an arrangement is referred to in industry as compartmentalized seating. Also, the seat back typically folds rearward when the occupant seated in the seat assembly collides with the seat back during a rear-end collision or during rebound after a front-end collision.

Recently a longstanding debate as to whether school buses should be equipped with seat belts has intensified and, as a result, more and more school buses are now being equipped with seat belt assemblies. Public pressure is building to require all school buses be equipped with seat belt assemblies. A strong consensus has already developed requiring the seat belt assemblies include a lap/shoulder belt combination similar to designs now installed in most modern automobiles.

In a vehicle, a seat belt assembly is mounted to the seat back and the seat back remains stationary relative to the vehicle in order for the seat belt to properly lock and restrain the occupant. However, in such a configuration, the benefits of the compartmentalized seating required by FMVSS 222 for school buses are lost, i.e., the seat back does not controllably collapse to absorb energy when an occupant strikes the seat back. Because school buses are often used to transport children, it is foreseeable that some children will buckle their seat belts while some other children will forget or refuse to buckle their seat belts.

Accordingly, it would be advantageous to develop a seat assembly that has a seat bottom that can flip up when not in use and a seat back that absorbs energy when occupants collide with the seat back during front-end and rear-end vehicle collisions while also providing adequate support for the seat belt assembly in the upright position such that the seat belt assembly properly functions when the occupant is buckled into the seat belt.

SUMMARY OF THE INVENTION AND ADVANTAGES

A seat assembly for a vehicle comprises a pedestal for mounting to the vehicle. A seat bottom is coupled to the pedestal and is rotatable about a first axis between a seating position and a stowed position. A seat back is coupled to the pedestal and is rotatable about a second axis spaced from the first axis from an upright position to a forward position in response to a predetermined force from behind the seat back. A deformable extension is fixed to and extends between the seat back and the pedestal and is configured to deform to absorb energy when the seat back rotates from the upright position to the forward position.

Because the seat bottom is rotatable between the seating position and the stowed position, the seat assembly is capable of satisfying FMVSS 217. In addition, because the seat back rotates from the upright position to the forward position in response to a predetermined force from behind the seat back, the seat assembly is capable of satisfying FMVSS 222. Specifically, the deformable extension can deform to absorb energy, for example, from an occupant who strikes the seat back during a front-end collision.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 11 is a cross-sectional view of the seat assembly along line A-A of FIG. 3 including the first embodiment of the energy absorbing apparatus when the seat back is in a forward position; and FIG. 12 is a cross-sectional view of the seat assembly along line A-A of FIG. 3 including the first embodiment of the energy absorbing apparatus when the seat back is in a rearward position.

DETAILED DESCRIPTION OF THE INVENTION

Figure 1:
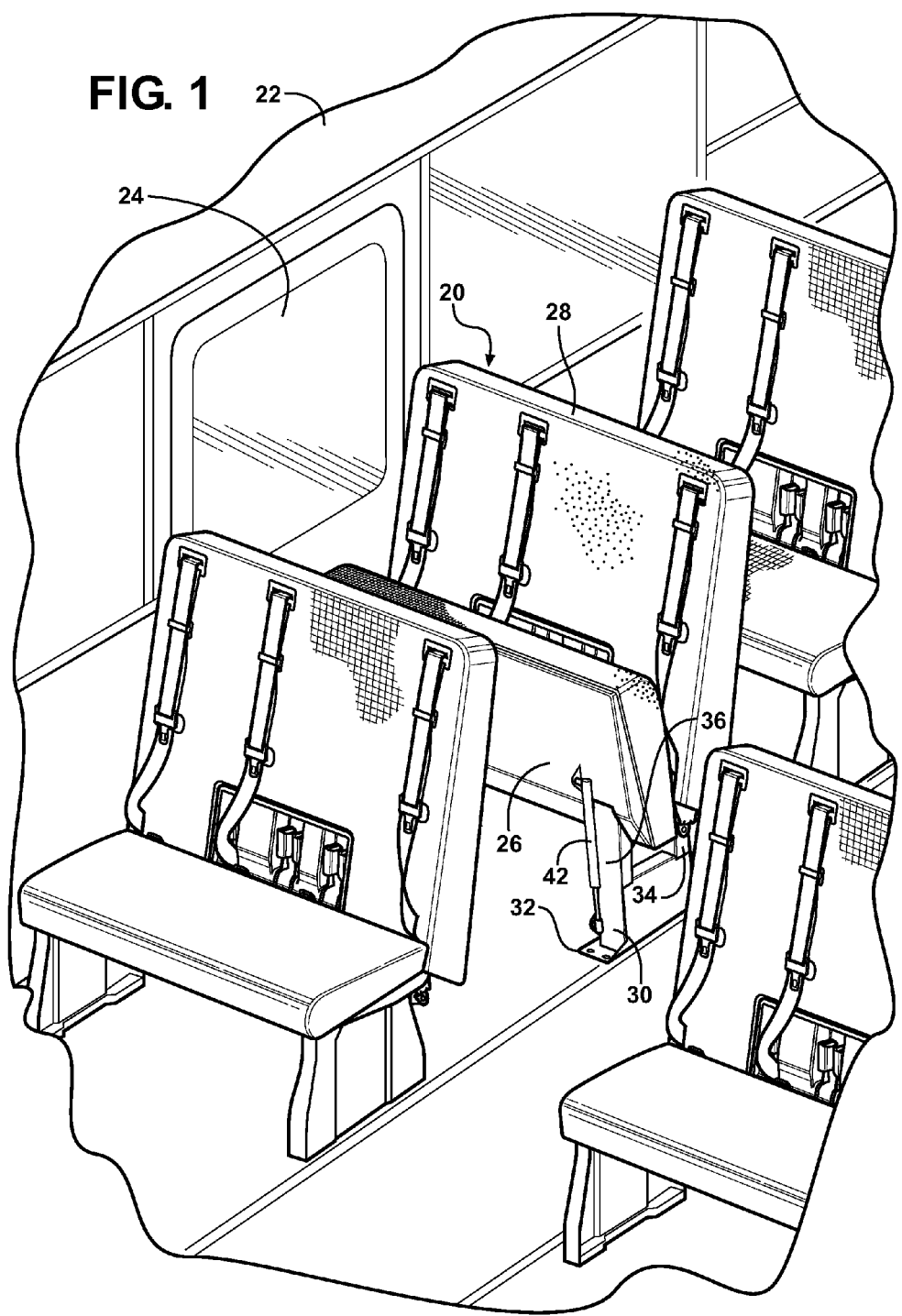
FIG. 1 is a perspective view of several seat assemblies mounted in rows to a floor of a vehicle.

Referring to the Figures, wherein like numerals indicate corresponding parts throughout the several views, a seat assembly is generally shown at 20. As shown in FIG. 1, the seat assembly 20 is typically disposed in a vehicle 22 such as, for example, a standard school bus. Several seat assemblies can be incorporated into the school bus in rows with the seat assembly 20 typically disposed adjacent an auxiliary exit door 24 of the vehicle 22. It should be appreciated that the seat assembly 20 may be used in any type of vehicle 22 including, for example, an automobile, an airplane, a train, or a boat.

Figure 2:
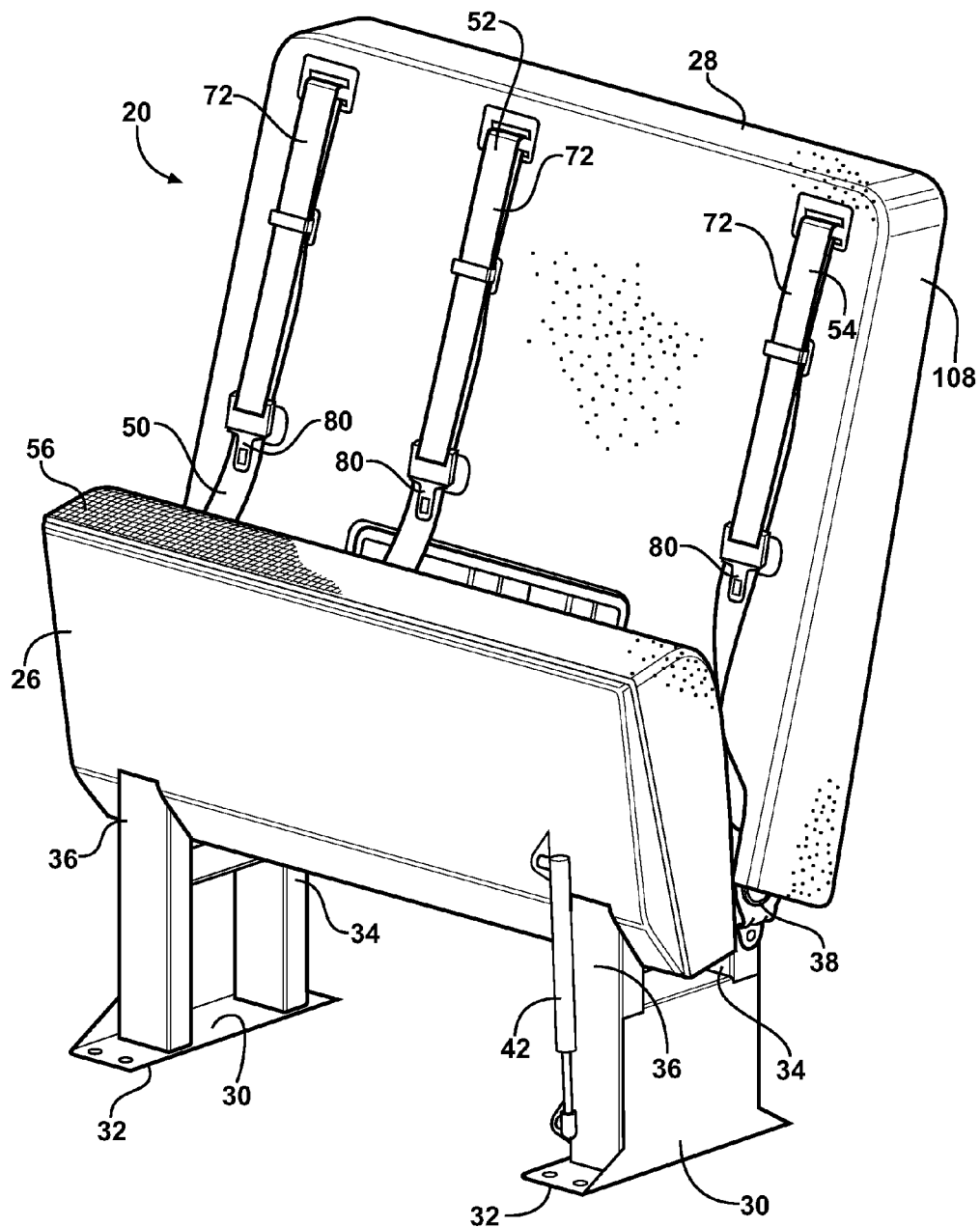
FIG. 2 is a perspective view of a seat assembly including a seat bottom and a seat back with the seat bottom in a stowed position.

With reference to FIG. 2, the seat assembly 20 includes a seat bottom 26 and a seat back 28 extending generally vertically from the seat bottom 26 when in an upright position. As described further below, the seat bottom 26 and the seat back 28 are independently pivotable relative to each other.

The seat assembly 20 typically includes a mounting pedestal 30 coupled to and extending downwardly from the seat bottom 26 and the seat back 28. The mounting pedestal 30 is typically mounted to a floor of the vehicle 22, as shown in FIG. 1. As shown in FIGS. 1-4, the seat assembly 20 can include a pair of pedestals 30. Alternatively, the seat assembly 20 can include any number of pedestals 30 without departing from the nature of the present invention. It should be appreciated that the seat assembly 20 may be coupled directly to a wall of the vehicle 22 without departing from the nature of the present invention.

The pedestal 30 typically includes a base 32 that is mounted to the floor of the vehicle 22. A member 34 extends from the base 32 to the seat back 28 beneath the seat back 28. A second member 36 is spaced from the member 34 and extends from the base 32 to the seat bottom 26 beneath the seat bottom 26. The member 34 and the second member 36 can be integral with the base 32, i.e., formed as a single part or joined in a firm and substantially permanent manner, such as by welding. In addition or in the alternative, the member 34 and the second member 36 can be formed separately from and affixed to the base 32, for example, with fasteners. Alternatively, the base 32 can be omitted and the member 34 and the second member 36 can be connected directly to the floor of the vehicle 22.

A rod 38 is coupled to the seat back 28 and a second rod 40 is coupled to the seat bottom 26 spaced from and in front of the rod 38. The rod 38 and the second rod 40 are typically parallel to one another. The second rod 40 extends along a first axis A1 and the rod 38 extends along a second axis A2.

The member 34 extends from the base 32 to the rod 38 and the second member 36 extends from the base 32 to the second rod 40. The rod 38 is fixed to the member 34 of the pedestal 30, i.e., does not move relative to the member 34, and the second rod 40 is typically fixed to the second member 36 of the pedestal 30. Typically, the rod 38 and the second rod 40 can be, for example, welded to the member 34 and the second member 36, respectively; however, it should be appreciated that the rod 38 and the second rod 40 can be fixed to the member 34 and the second member 36 in any fashion without departing from the nature of the present invention. It should also be appreciated that the second rod 40 can be a single piece, as best shown in FIG. 3, or can be formed of two shorter rods with one of the shorter rods connected to one pedestal 30 and the other shorter rod connected to the other pedestal 30.

Figure 3:
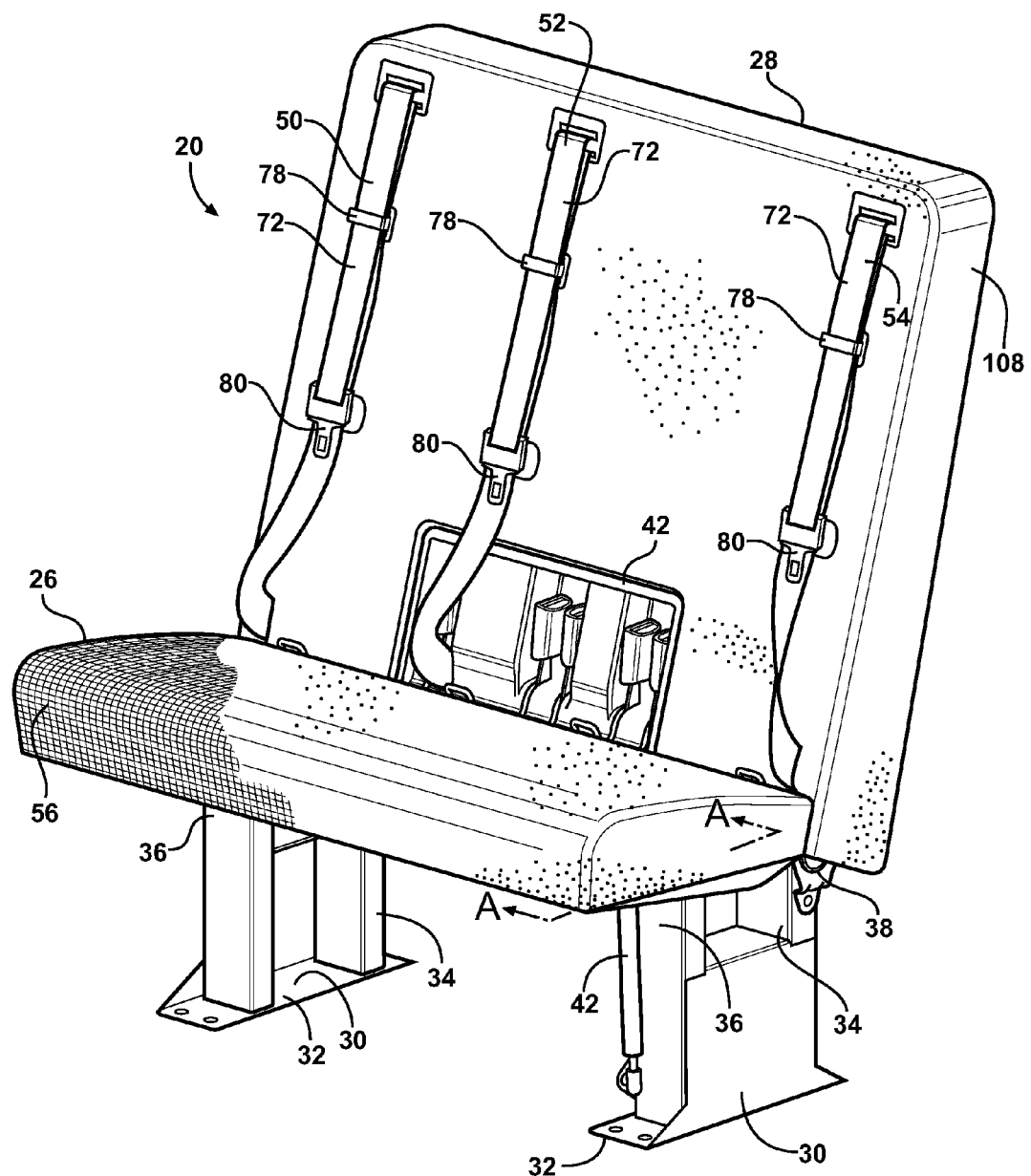
FIG. 3 is a perspective view of a portion of the seat assembly with some components removed to illustrate interior components and with the seat bottom in a seating position.

The seat bottom 26 is rotatably coupled to the second rod 40 of the pedestal 30 and is rotatable about the first axis A1 between a stowed position, shown in FIG. 2, and a seating position, shown in FIG. 3. The seat bottom 26 is typically biased toward the stowed position. In other words, when no weight is exerted on the seat bottom 26, such as in the absence of an occupant on the seat bottom 26, the seat bottom 26 automatically rotates to the stowed position. An occupant can rotate the seat bottom 26 to the seating position and can sit on the seat bottom 26 so that the weight of the occupant maintains the seat bottom 26 in the seating position. It should be appreciated that for illustrative purposes the seat bottom 26 is in the seating positioning in FIG. 3 without an occupant on the seat bottom 26 and that typically the seat bottom 26 is in the stowed position when there is no force, such as from the weight of an occupant, forcing the seat bottom 26 to the seating position.

The seat assembly 20 typically includes a biasing device connected to the seat bottom 26 to bias the seat bottom 26 toward the stowed position. For example, the biasing device can be a strut 42, such as a hydraulic or pneumatic strut, that extends from the pedestal 30 to the seat bottom 26. Alternatively, the biasing device can be a torsion spring. However, it should be appreciated that the biasing device can be of any kind without departing from the nature of the present invention.

The seat assembly 20 can be disposed adjacent the auxiliary exit door 24 and can be rotated to the stowed position for egress and ingress through the auxiliary exit door 24. Per FMVSS 217, seat assemblies adjacent an auxiliary exit door 24 are required to have seat cushions that automatically flip up when not in use so that a clear aisle to the auxiliary exit door 24 exists.

The seat bottom 26 typically includes a bottom frame 44 formed of metal. However, it should be appreciated that the bottom frame 44 can be constructed from other materials not described herein that are capable of providing the necessary support and strength.

When rotating in the direction from the stowed position to the seating position, the seat bottom 26 is typically stopped at the seating position. For example, a tether 106 or other positive stop device stops the seat bottom 26 at the seating position when rotated from the stowed position. The tether 106 can extend from the seat bottom 26, e.g., the bottom frame 44, to the pedestal 30. The tether 106 is sized and positioned to be slack when the seat bottom 26 is between the stowed position and the seating position. When the seat bottom 26 is rotated to the seating position, the tether 106 becomes taut to prevent further rotation of the seat bottom 26 beyond the seating position. The tether 106 can be formed of, for example, braided metal wire or any other suitable material. It should be appreciated that the seat bottom 26 can be stopped in the seating position in any way without departing from the nature of the present invention.

Figure 5:
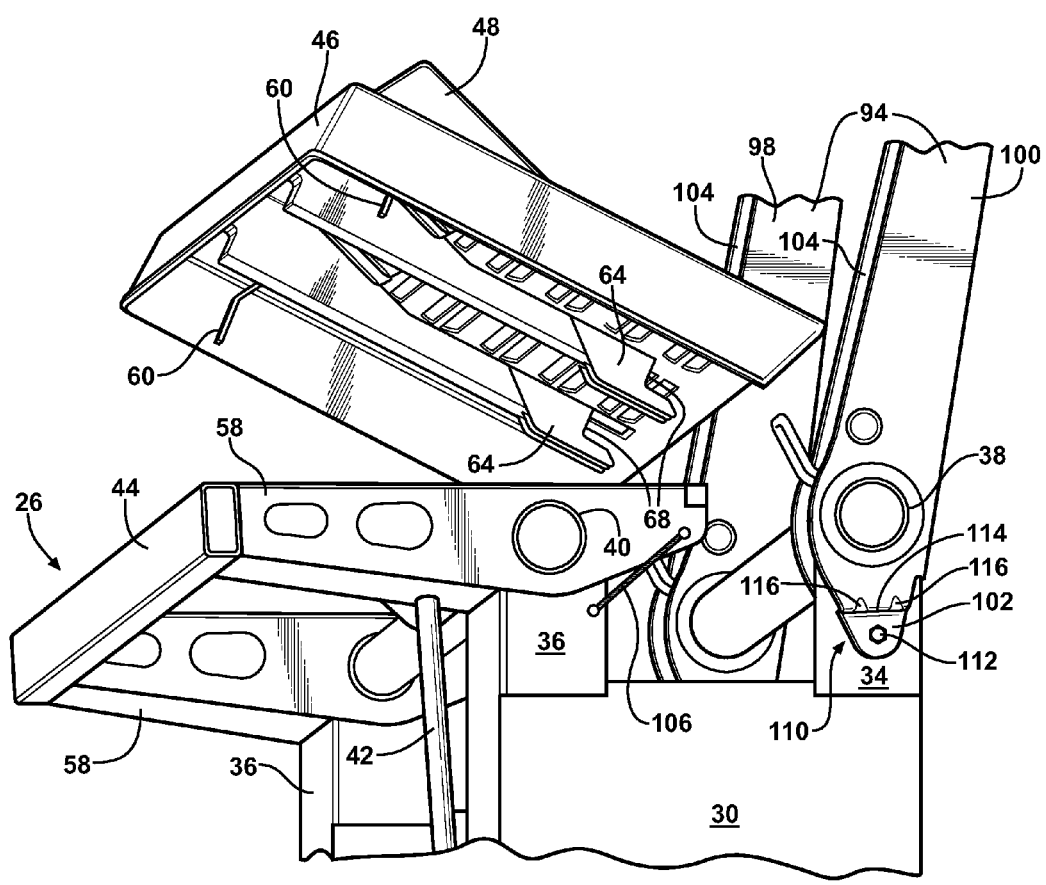
FIG. 5 is a perspective fragmented view of a portion of the seat assembly with a seat pan exploded away from a bottom frame.

As best shown in FIG. 5, a seat pan 46 is typically disposed on the bottom frame 44. The seat pan 46 is, for example, formed by injection molding. However, it should be appreciated that the seat pan 46 can be formed from any material and by any method, such as, but not limited to blow molding or thermoforming without departing from the nature of the present invention. Alternatively, the seat pan 46 can be formed of plywood covered with foam and upholstery.

The seat pan 46 may include a ramp 48 along a front edge for urging occupants of the seat assembly 20 toward the seat back 28 and to reduce the likelihood that the occupant slides relative to the lap portion of a seatbelt 50, 52, 54 when the vehicle 22 is stopped abruptly resulting in improper occupant restraint as the lap portion of the seatbelt 50, 52, 54 bears on softer abdominal tissue instead of the pelvic bone of the occupant, which is typically referred to in industry as "submarining."

Seat upholstery 56 can be attached to the seat pan 46. For example, the seat upholstery 56 includes fabric and J-clips (not shown) attached to the fabric. In such a configuration, the J-clips attach to the seat pan 46 without the need for secondary fasteners. As such, the seat upholstery 56 is removable from the seat pan 46 by disconnecting the J-clips from the seat pan 46 such that the seat upholstery 56 can be easily removed for cleaning, repair, or replacement. Alternatively, the J-clips could attach to themselves, i.e., mating pairs, if the seat upholstery 56 is wrapped around the seat back 28, and the J-clips can connect directly to the seat pan 46 to fasten the seat upholstery 56 the seat cushion. As set forth above, the ramp 48 can be defined by the seat pan 46. Alternatively, the ramp 48 can be formed by disposing a separate element (not shown) between the seat pan 46 and the seat upholstery 56 without departing from the nature of the present invention.

Figure 4:
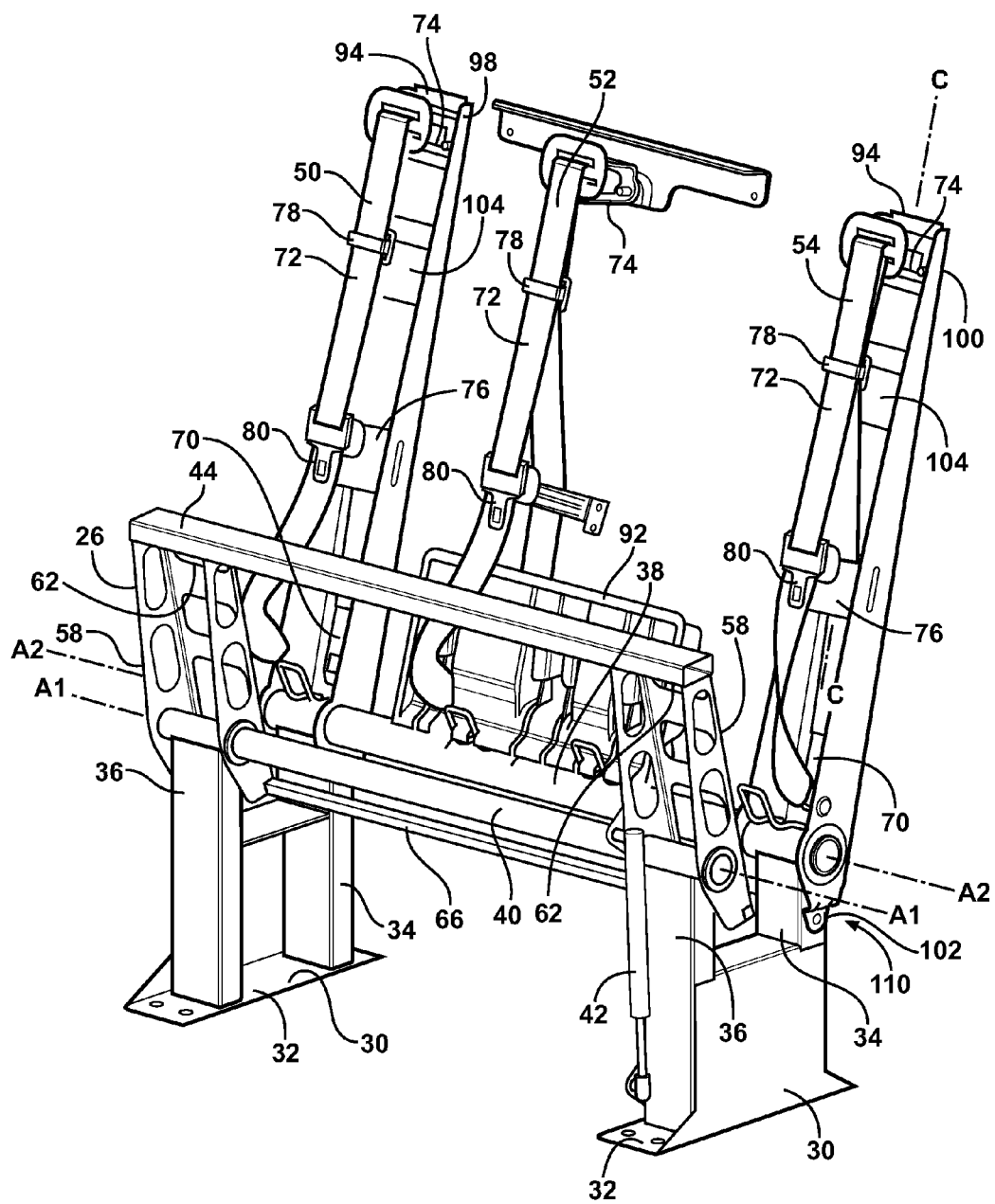
FIG. 4 is another perspective view of a portion of the seat assembly with components removed to illustrate interior components.

The bottom frame 44 of the seat bottom 26 has at least one support member 58 extending horizontally for supporting an occupant. The support member 58 of the seat bottom 26 extends transversely to the rod 38 and typically defines a hole receiving the rod 38 for coupling the support member 58 and the rod 38. As best shown in FIG. 4, the bottom frame 44 typically includes two support members 58; however, it should be appreciated that the seat bottom 26 can include any number of support members 58 without departing from the nature of the present invention. The seat pan 46 is supported by the support member 58 for supporting the seated occupant.

Figure 10:
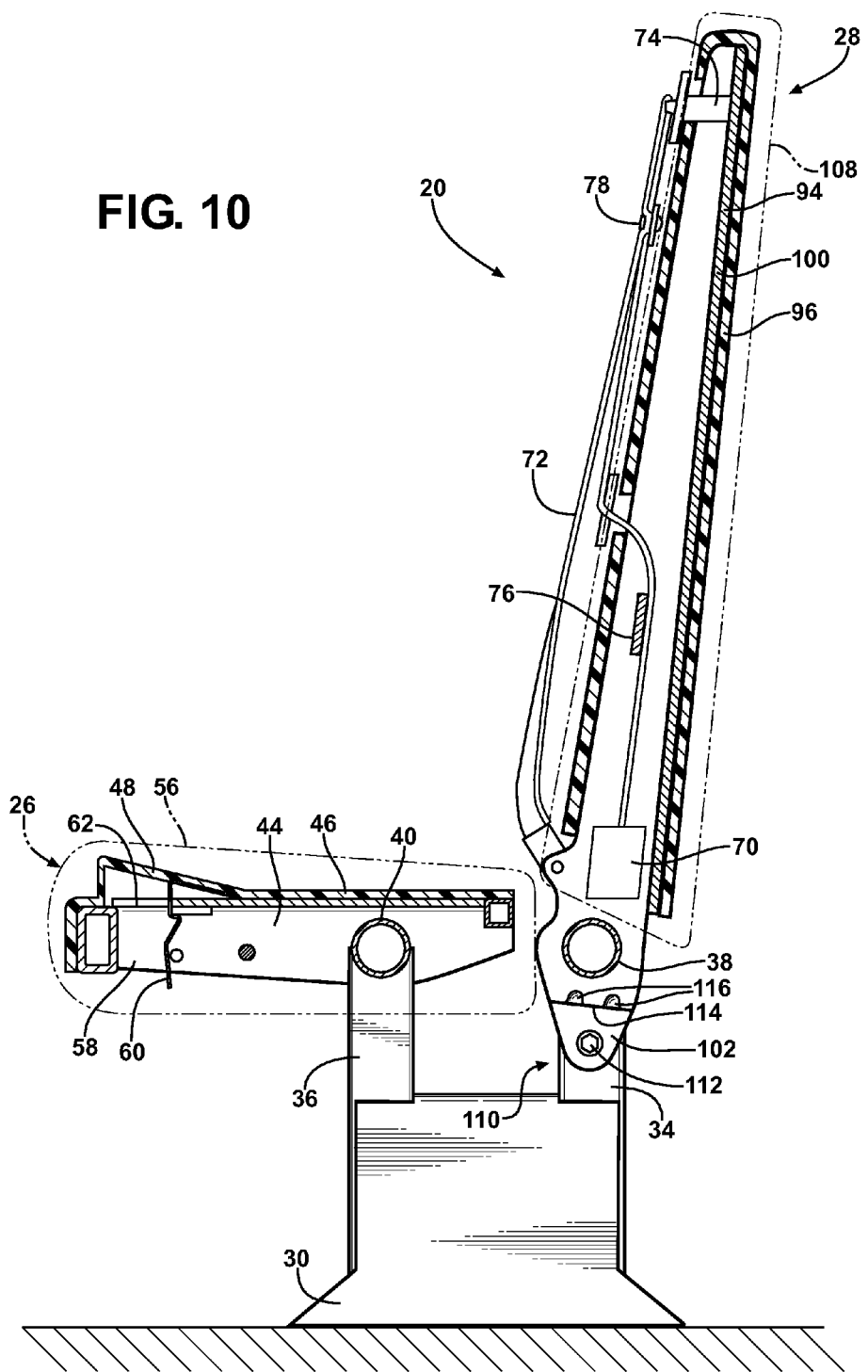
FIG. 10 is a cross-sectional view of the seat assembly along line A-A of FIG. 3 including the first embodiment of the energy absorbing apparatus when the seat back is in an upright position.

With reference to FIGS. 10-12, at least one clip 60 extends downwardly from the seat pan 46 to connect the seat pan 46 to the bottom frame 44. The clip 60 is moveable between an engaged position engaging the support member 58 for attaching the seat pan 46 to the support member 58 and a disengaged position disengaged from the support member 58 for selectively removing the seat pan 46 from the bottom frame 44.

Specifically, the support member 58 defines a hole 62 and the clip 60 extends into the hole 62 when the clip 60 is moved toward the engaged position. As such, a downward vertical force applied to the seat pan 46, such as the weight of the occupant on the seat pan 46, urges the clip 60 toward the engaged position. This configuration ensures attachment of the seat pan 46 to the support member 58 when the occupant is seated on the seat pan 46. Typically, the clip 60 is disposed on the seat pan 46 and the hole 62 is defined in the support member 58. Alternatively, the clip 60 can be on the support member 58 and the hole 62 can be defined in the seat pan 46 without departing from the nature of the present invention. The seat assembly 20 includes two clips 60 and two holes 62 in the Figures; however, it should be appreciated that the seat assembly 20 can include any number of clips and corresponding holes without departing from the nature of the present invention.

With reference to FIG. 5, the seat pan 46 includes a finger 64 engaging the bottom frame 44 to attach the seat pan 46 to the bottom frame 44. The seat pan 46 includes two fingers 64 in the Figures; however, it should be appreciated that the seat pan 46 can include any number of fingers 64 and corresponding without departing from the nature of the present invention.

The bottom frame 44 typically includes a cross bar 66 extending along a rear of the bottom frame 44. The fingers 64 slide under the cross bar 66 to engage the seat pan 46 to the bottom frame 44. It should be appreciated that the bottom frame 44 can include more than one cross bar 66 for engaging the fingers 64 without departing from the nature of the present invention.

The seat pan 46 is connected to the bottom frame 44 by first engaging the fingers with the bottom frame 44, e.g., inserting the fingers 64 into engagement with the cross bar 66. When inserted into the holes 62, the cross bar 66 is pinched between the fingers 64 and another portion of the seat pan 46. The seat pan 46 is then slid toward the seat back 28 to firmly seat the fingers 64 against the cross bar 66. The fingers 64 include a stop surface 68 that abuts the cross bar 66 to ensure proper location of the seat pan 46 relative to the support member 58, i.e., the seat pan 46 is properly located relative to the bottom frame 44 when the stop surface 68 abuts the cross bar 66.

When the seat pan 46 is properly located relative to the bottom frame 44, the clips 60 are aligned with the holes 62 in the support member 58. Once the seat pan 46 is properly located relative to the bottom frame 44, a downward force is exerted on the seat pan 46 to engage the clips 60 with the holes 62. Notably, the clip 60 is moveable to the engaged position only when the finger 64 is engaged with the hole 62.

To remove the seat pan 46 from the bottom frame 44, the clips 60 are biased away from the holes 62 in the support member 58 to allow the clips 60 to pass through the holes 62 such that the fingers 64 can be removed from the cross bar 66. The configuration allows for easy installation and removal of the seat pan 46 while ensuring a reliable connection between the seat pan 46 and the bottom frame 44. The seat pan 46 can be installed to and removed from the bottom frame 44 without the use of tools. Accordingly, the seat pan 46 can be easily removed for repair or replacement without complicated disassembly.

Figure 6:
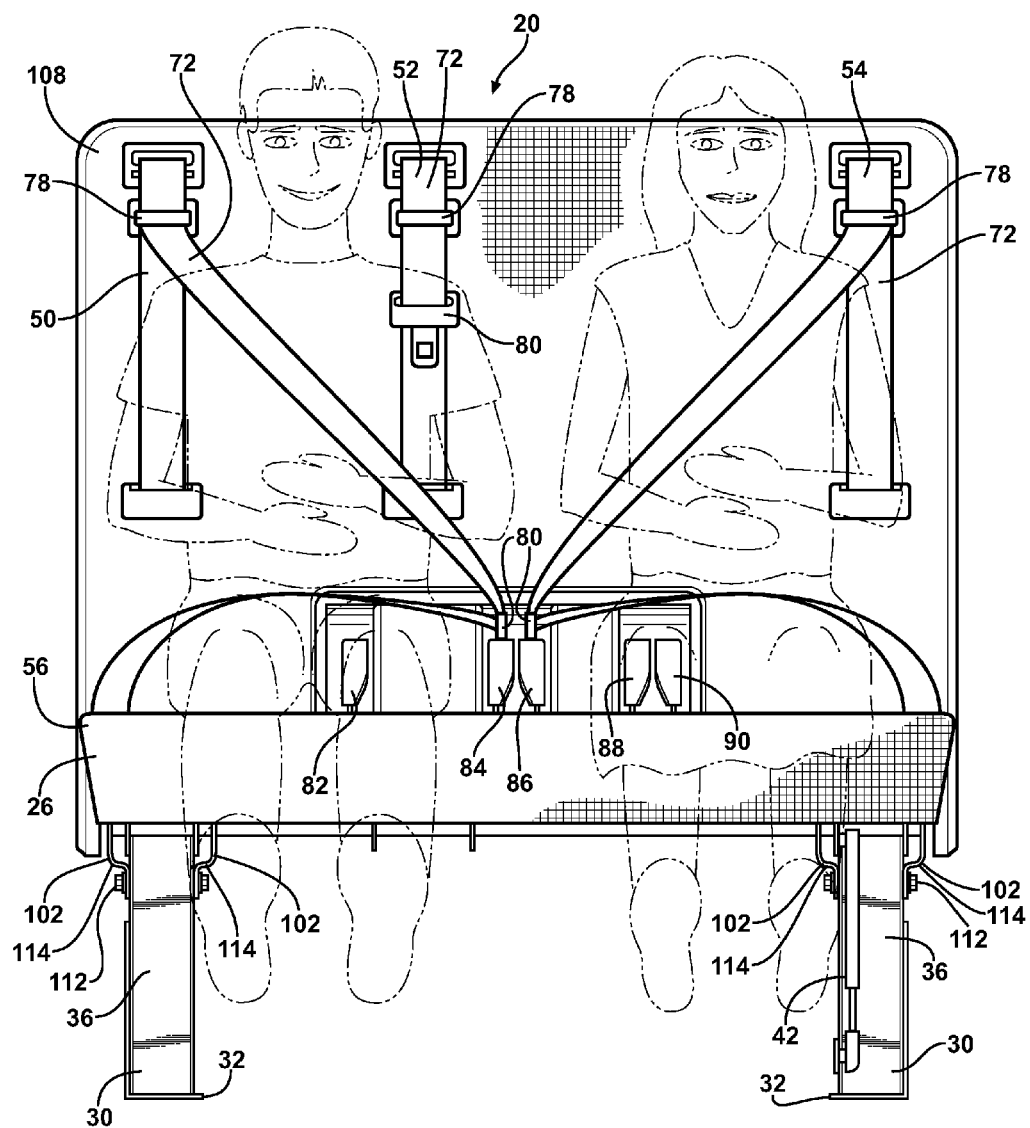
FIG. 6 is a front view of the seat assembly configured in a two occupant configuration.
Figure 7:
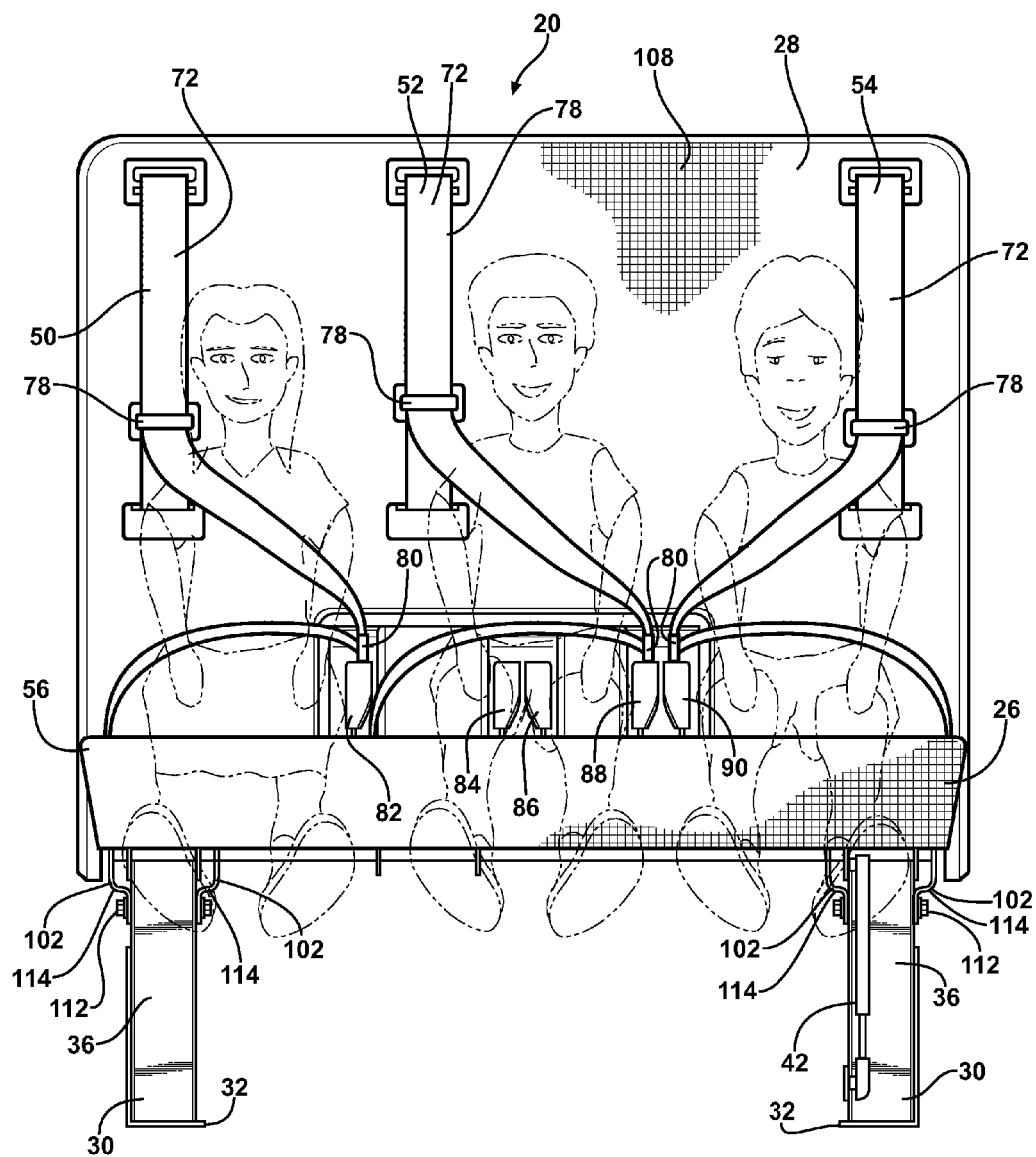
FIG. 7 is a front view of the seat assembly configured in a three occupant configuration.

The seat assembly 20 can, for example, include a plurality of seatbelts 50, 52, 54 and corresponding hardware configurable for use by either two larger occupants in a two occupant configuration, as shown in FIG. 6, or three smaller occupants in a three occupant configuration, as shown in FIG. 7. The seatbelts 50, 52, 54 and the corresponding hardware can be that which are known in industry. Accordingly, the seatbelts 50, 52, 54 and the seatbelt hardware are not described in detail herein. Additionally, methods of attaching the hardware to the rest of the seat assembly 20 are also well known and are not described in detail herein. The hardware, for example, includes such items as a retractor 70, a belt 72, i.e., webbing, extendable from the retractor 70, a shoulder retainer 74, a middle retainer 76 for receiving the belt 72 to anchor the belt 72 to the seat back 28, a belt height adjuster 78, also referred to in industry as an webbing adjuster, coupled to the belt 72, and a latch plate 80 coupled to the belt 72. The belt height adjuster 78 is moved up and down along the belt 72 depending on the shoulder height of the occupant seated in the seat assembly 20 in order to position the torso webbing across the clavicle of each properly seated occupant. Alternatively, the seat assembly 20 and seatbelts can be designed for a fixed number of occupants, i.e., only two occupants, only three occupants, etc.

The seat assembly 20 can include a first seatbelt 50, a second seatbelt 52, and a third seatbelt 54. The first and third seatbelts 50, 54 are coupled to the seat back 28. The second seatbelt 52 can be coupled to the seat back 28, the rod 38, or the pedestal 30.

Referring to FIG. 2, moving along a rear edge, i.e., the bight line, of the seat back 28 along a direction from a left side to a right side of the seat back 28, the first seatbelt 50 is disposed at the left side. The second seatbelt 52 is disposed at approximately ⅓ of the distance from the left side to the right side. The third seatbelt 54 is disposed at the right side.

The seat assembly 20 can, for example, include a plurality of buckles 82, 84, 86, 88, 90 for receiving the latch plates 80 of the first, second, and third seatbelts 50, 52, 54, respectively. Specifically, the seat assembly 20 includes a first buckle 82, a second buckle 84, a third buckle 86, a fourth buckle 88, and a fifth buckle 90. With reference to FIG. 2, moving along the rear edge of the seat back 28 along the distance from the left side to the right side of the seat back 28, the first buckle 82 is disposed at approximately ⅓ of the distance from the left side to the right side. The second and third buckles 84, 86 are disposed at approximately ½ of the distance from the left side to the right side. The fourth and fifth buckles 88, 90 are disposed at approximately ⅔ of the distance from the left side to the right side. As best shown in FIG. 4, a tray 92 is typically disposed in the seat back 28 to house the buckles 82, 84, 86, 88, 90.

Typically, the second and third buckles 84, 86 and the fourth and fifth buckles 88, 90 are disposed adjacent each other. Alternatively, the second and third buckles 84, 86 can integrally extend from each other and the fourth and the fifth buckles 88, 90 can integrally extend from each other.

When the seat assembly 20 is utilized for seating the two larger occupants, as shown in FIG. 6, the latch plate 80 of the first seatbelt 50 locks into the second buckle 84 and the latch plate 80 of the third seatbelt 54 locks into the third buckle 86. Alternatively, when the seat assembly 20 is utilized for seating the three smaller occupants, as shown in FIG. 7, the latch plate 80 of the first seatbelt 50 locks into the first buckle 82, the latch plate 80 of the second seatbelt 52 locks into the fourth buckle 88, and the latch plate 80 of the third seatbelt 54 locks into the fifth buckle 90.

Accordingly, the first, fourth, and fifth buckles 82, 88, 90 are not utilized in the two occupant configuration. Likewise, the second and third buckles 84, 86 are not utilized in the three occupant configuration. Therefore, if one does not want the versatility of switching between the two occupant configuration and the three occupant configuration, and only wishes to provide seating for the two occupant configuration, then the first, fourth, and fifth buckles 82, 88, 90, may be omitted from the seat assembly 20 to reduce cost. Likewise, if one only wishes to provide seating for the three occupant configuration, then the second and third buckles 84, 86 may be omitted from the seat assembly 20 to reduce cost.

The latch plates 80 on the seatbelts 50, 52, 54 and the buckles 82, 84, 86, 88, 90 are typically visually coded and/or "keyed" to assist the occupants in properly pairing the latch plates 80 and the buckles 82, 84, 86, 88, 90 for the two occupant configuration or the three occupant configuration. Specifically, with respect to visual coding, the latch plate 80 on the second seatbelt 52 is visually coded similarly to the fourth buckle 88 to indicate to occupants that the latch plate 80 on the second seatbelt 52 corresponds to the fourth buckle 88. For example, the visual coding includes color coding such that corresponding latch plates 80 and buckles 82, 84, 86, 88, 90 are similarly colored. Another example of visual coding includes text printed on or imbedded on the latch plates 80 and buckles 82, 84, 86, 88, 90. Likewise, with respect to keying, the latch plate 80 on the second seatbelt 52 is keyed similarly to the fourth buckle 88 so that the latch plate 80 on the second seatbelt 52 can only engage the fourth buckle 88.

With reference to FIGS. 2-4, the seat back 28 includes a back frame 94 and a back panel 96 disposed over the back frame 94. The back panel 96 will be discussed in further detail below. The back frame 94 is typically formed of a metal, such as steel or aluminum. However, it should be understood that the back frame 94 may be constructed from other materials not described herein that are capable of providing the necessary support and strength. The seat back 28 may include foam pillows or other cushioning material (not shown) positioned to absorb energy from an occupant who uncontrollably strikes the seat back 28 in front of the occupant when the vehicle 22 is accelerated abruptly.

The seat back 28 is rotatably coupled to the rod 38. The back frame 94 includes a first tower 98 and a second tower 100, each extending generally upwardly from the rod 38. Typically, the rod 38 is cylindrical, i.e., has a round cross-section and both of the first and the second towers 98, 100 defines a round hole receiving the rod 38. The rod 38 and the round holes are sized such that the towers 98, 100 are rotatable about the rod 38. Specifically, the rod 38 extends along a second axis A2 and the towers 98, 100 selectively rotate about the second axis A2, as set forth further below. It should be appreciated that the back frame 94 can include any number of towers without departing from the nature of the present invention.

Figure 8:
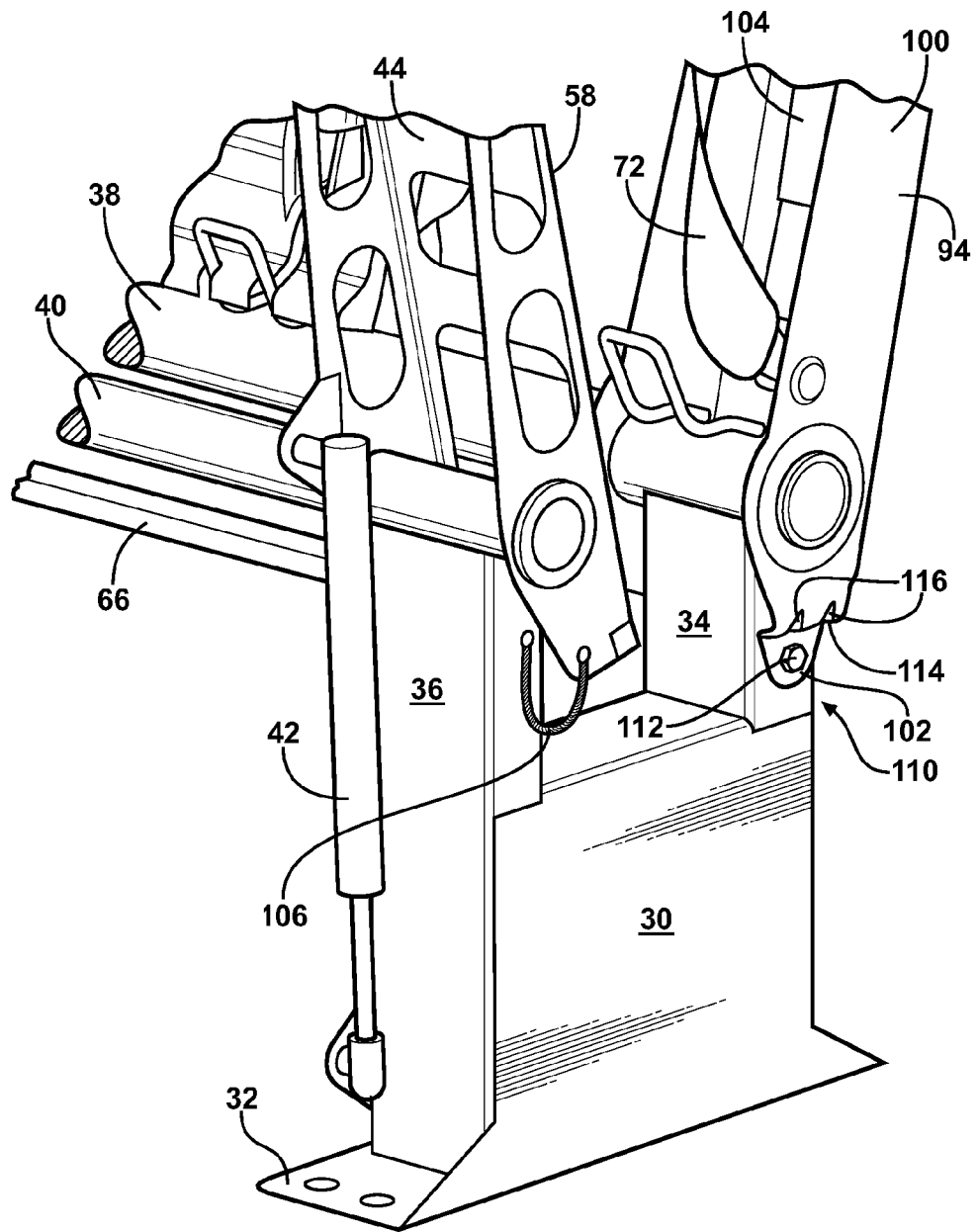
FIG. 8 is a perspective view of a portion of the seat assembly including an energy absorbing apparatus.
Figure 9:
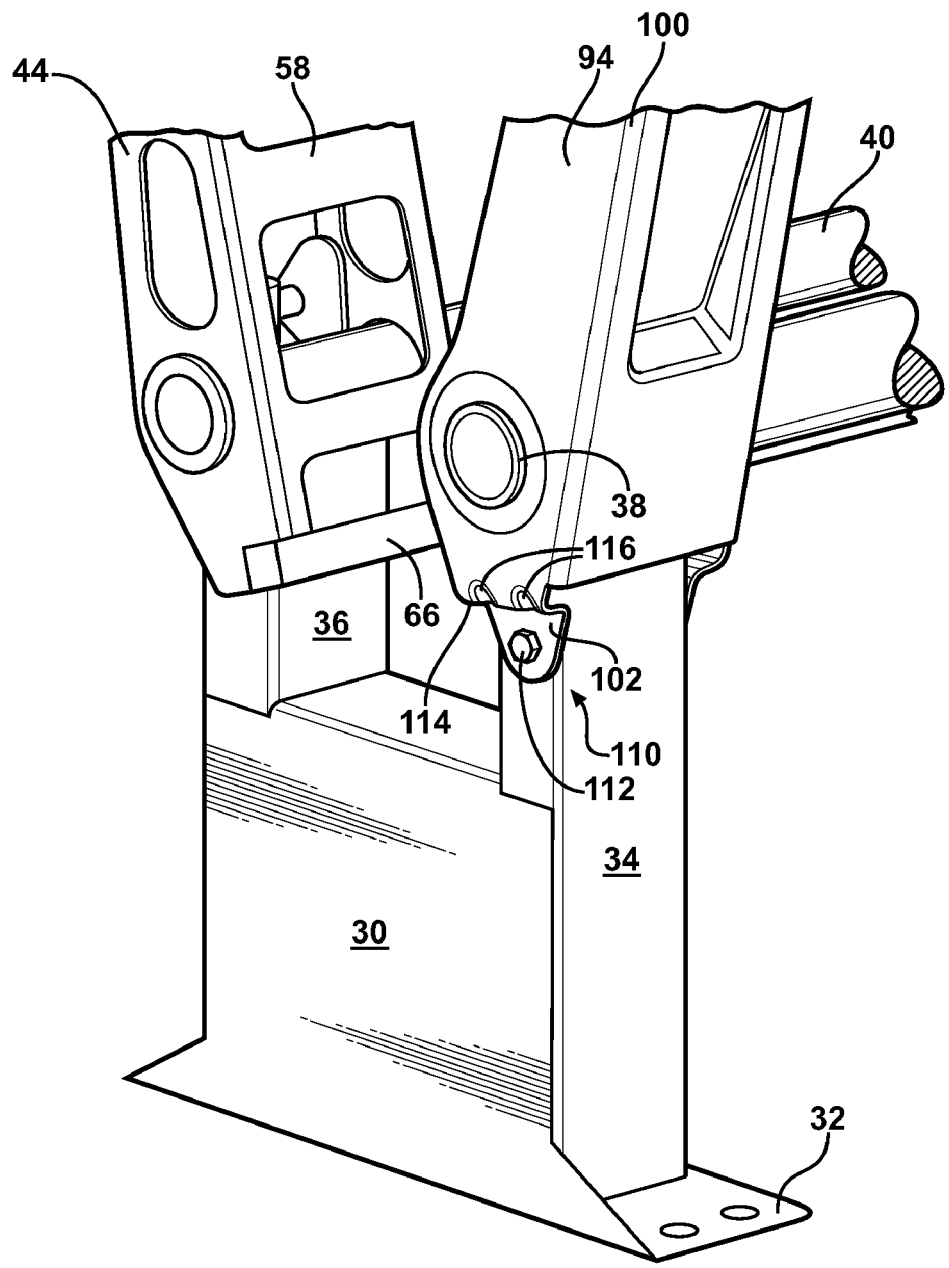
FIG. 9 is another perspective view of a portion of the seat assembly.

At least one deformable extension 102 extends from seat back 28 and more specifically from the towers 98, 100. The first and second towers 98, 100 are spaced about the second axis A2 from the deformable extension 102 for supporting an occupant seated on the seat bottom 26. Each tower typically includes a pair of deformable extensions 102, as best shown in FIGS. 8 and 9; however, it should be appreciated that the towers 98, 100 can include one, two, or more deformable extensions 102 without departing from the nature of the present invention. The towers 98, 100 and the deformable extensions 102 typically extend along a common axis C that intersects the second axis A2. However, it should be appreciated that the deformable extension 102 can extend transversely to the towers 98, 100 without departing from the nature of the present invention. The extension 102 can be integrally formed with the towers 98, 100, i.e., formed as a single part, or can be formed separately and subsequently attached to the respective tower 98, 100.

The back panel 96 structurally reinforces the towers 98, 100 of the seat back 28. In other words, the back panel 96 ties together the towers 98, 100 and creates a structure for the seat back 28. The back panel 96 is typically formed by blow molding. However, it should be appreciated that the back panel 96 can be formed from any material and by any method, such as, but not limited to plastic injection molding, thermoforming, metal stamping welded to the back frame 94, etc. without departing from the nature of the present invention.

The back panel 96 is typically hollow and receives each of the towers 98, 100. Typically the back panel 96 has a back portion presenting a concave configuration for increasing a space between the back panel 96 and a subsequent row. It should be appreciated that there are requirements for spacing between rows of seat assemblies on school buses. It is advantageous to provide a seat assembly 20 with a concave seat back 28 such that the concave seat back 28 provides additional spacing which allows for the installation of the maximum number of rows of seat assemblies in a school bus by efficiently designing the seat back 28 to be of the minimum thickness necessary to meet the performance requirement.

With reference to FIG. 4, both of the towers 98, 100 define a channel 104, i.e., both of the towers 98, 100 are generally U-shaped. The retractors 70 of the first and third seatbelts 50, 54 are disposed in the channel 104 of the first and the second towers 98, 100, respectively, and are connected to the first and second towers 98, 100, respectively. As such, the belt 72 extends upwardly from the retractor 70 within the channel 104 and then from the middle retainer 76 to the shoulder retainer 74 along the outside of the back panel 96. Typically, the middle retainer 76 is coupled along the tower 98, 100 and the shoulder retainer 74 is coupled near an end of the tower 98, 100 opposite the support member 58. It should be appreciated that the positioning of the middle retainer 76 and the shoulder retainer 74 may vary without departing from the nature of the present invention. It should be appreciated that the back frame 94 can include a third tower (not shown) with the retractor 70 of the second seatbelt 52 coupled to the third tower.

The configuration of the seatbelts strung between the middle retainer 76 and the shoulder retainer 74 advantageously reduces or eliminates lateral forces, i.e., twisting of the seat back 28, when the seatbelt 50, 52, 54 is activated to retain an occupant. In other words, the belt 72 of the seatbelt 50, 52, 54 exerts primarily a bending force on the tower 98, 100. As such, material that increases the resistance of the towers 98, 100 to twisting can be reduced, which is advantageous with respect to cost to manufacture and packaging.

Back upholstery 108 can be attached to the back panel 96. For example, the back upholstery 108 can include fabric with J-clips (not shown) attached to the fabric. As with the seat upholstery 56 on the seat bottom 26, the J-clips attach to the back panel 96 of the seat back 28 or to each other, i.e., interlocking J-clips. As such, the back upholstery 108 is removable from the seat back 28 by disconnecting the J-clips from the back panel 96.

The buckles 82, 84, 86, 88, 90 are spring loaded such that the buckles 82, 84, 86, 88, 90 are biased toward the tray 92. As such, the occupant pulls the buckle 82, 84, 86, 88, 90 out of the tray 92 against the bias of the spring load to lock one of the latch plates 80 into the buckle 82, 84, 86, 88, 90. When the latch plate 80 is released from the buckle 82, 84, 86, 88, 90, the spring load biases the buckle 82, 84, 86, 88, 90 toward the tray 92 and the buckle recesses back into the tray 92. As such, the occupants comfortably sit on the seat assembly 20 without uncomfortable contact with any one of the buckles 82, 84, 86, 88, 90. Specifically, in the two occupant configuration, one of the occupants is seated in front of the first buckle 82 and the other occupant sits in front of the fourth and fifth buckles 88, 90. In the three occupant configuration, a middle occupant is seated in front of the second and third buckles 84, 86.

As set forth further below, the seat assembly 20 is typically designed such that the seat back 28 is maintained in the upright position, as shown in FIG. 10, when subjected to typical forces exerted by occupants seated on the seat assembly 20 under normal conditions. The seat back 28 is rotatable about the second axis A2 from the upright position to a forward position, as shown in FIG. 11, in response to a predetermined force from behind the seat back 28. The magnitude of the predetermined force from behind the seat back 28 required to rotate the seat back 28 can be designed to meet certain requirements. An occupant who uncontrollably moves forward and strikes the seat back 28 in front of the occupant when the vehicle 22 is abruptly stopped, such as during a front-end collision of the vehicle 22, can exceed the predetermined force from behind the seat back 28 so that the seat back 28 rotates.

The seat back 28 is also rotatable about the second axis A2 from the upright position away from the forward position to a rearward position, as shown in FIG. 12, in response to a predetermined force from in front of the seat back 28. The magnitude of the predetermined force from in front of the seat back 28 required to rotate the seat back 28 can be designed to meet certain requirements. An occupant who uncontrollably moves backward and strikes the seat back 28 in which the occupant is seated when the vehicle 22 is abruptly stopped, such as during a rear-end collision of the vehicle 22 or during occupant rebound during a front-end collision, can exceed the predetermined force from in front of the seat back 28 so that the seat back 28 rotates.

The seat assembly 20 includes an energy absorbing apparatus 110 for absorbing energy, such as, during front-end and rear-end collisions of the vehicle 22. The energy absorbing apparatus 110 controls rotation of the seat back 28 about the second axis A2. When no loads are applied to the seat back 28, the energy absorbing apparatus 110 maintains the seat back 28 in the upright position, as shown in FIG. 10, to support the back of occupants seated on the seat assembly 20. Said differently, the energy absorbing apparatus 110 couples the towers 98, 100 of the seat back 28 to the pedestal 30 for providing rigidity to the seat back 28 in the upright position. It should be appreciated that the "upright position" can also be referred to as the design position because it is a position of the seat back 28 as designed to support the back of occupants during normal use. As such, it should be appreciated that the "upright position" can be vertical or can be angled forwardly or rearwardly from vertical. It should also be appreciated that the energy absorbing apparatus 110 can be of any type without departing from the nature of the present invention.

The energy absorbing apparatus 110 allows the seat back 28 to rotate about the second axis A2 when the predetermined force is applied to the seat back 28. The seat back 28 of the seat assembly 20 on which the occupant is seated provides adequate support such that the seatbelt 50, 52, 54 locks and prevents the occupant from flying forward. In other words, the seat back 28 remains generally in the upright position in order for the seatbelt 50, 52, 54 to properly function and stop the occupant buckled thereto from uncontrollably moving forward. However, some occupants may forget or refuse to use the seatbelt 50, 52, 54 and in a situation involving an abrupt stop, the occupant who is not buckled to with the seatbelt can move forward and strike the seat back 28 of the seat assembly 20 in front of the occupant. Therefore, the seat back 28 the ability to absorb energy from the unseated occupant, as required by the National Highway Transportation Safety Administration's (NHTSA) Federal Motor Vehicle Safety Standards (FMVSS), specifically FMVSS 222. In addition, the seat back 28 has some flexibility in order to absorb energy from an occupant seated in the seat assembly 20 during a rear-end collision of the vehicle 22 or during rebound after a front end collision of the vehicle 22. The energy absorbing apparatus 110 is designed to provide such energy absorbing capability while also maintaining the seat back 28 in the generally upright position before being subjected to the predetermined force. The energy absorbing apparatus 110 will bend and absorb energy in the designed manner, but also limits the rotation of the seat back 28 to a predetermined rotational angle.

The energy absorbing apparatus 110 includes the deformable extension 102. The deformable extension 102 is fixed to and extends between the seat back 28 and the pedestal 30. Because the member 34 is fixed to the rod 38 and to the extension 102, rotation of the seat back 28 in forward and rearward rotation exerts bending forces on the member 34 and the extension 102. At least one of the extension 102 and the member 34 deforms to absorb energy when the seat back 28 rotates in forward and rearward rotation.

Typically, the deformable extension 102 is configured to deform to absorb energy when the seat back 28 rotates from the upright position to the forward position and is configured to deform to absorb energy when the seat back 28 rotates from the upright position to the rearward position. The deformable extension 102 can be configured to absorb a different amount of energy when the seat back 28 rotates based on whether the seat back 28 rotates to the forward position or to the rearward position. Specifically, the deformable extension 102 can, for example, be configured to bend to absorb a first amount of energy when the seat back 28 rotates to the forward position and can be configured to bend to absorb a second amount of energy when the seat back 28 rotates to the rearward position. As such, the seat assembly 20 can be tuned to absorb the proper amount of energy depending upon the direction of impact to which the seat back 28 is subjected. Alternatively, the deformable extension 102 can be configured to absorb the same amount of energy when the seat back 28 rotates to the forward position and to the rearward position. As set forth below, the energy absorption of the deformable extension 102 can be designed by altering the geometry and material type of the deformable extension 102.

In FIGS. 11-12, the extension 102 deforms and the member 34 remains undeformed when the seat back 28 rotates in forward and rearward rotation. In such a configuration, the member 34 is stationary relative to the seat back 28 when the seat back 28 rotates from the upright position to the forward position. The extension 102 is deformable relative to the member 34. As such, the member 34 remains relatively rigid and undeformed and extension 102 deforms to absorb energy when the seat back 28 rotates in forward rotations and rearward rotation.

Alternatively, both the extension 102 and the member 34 deform when the seat back 28 rotates in forward and rearward rotation. The extension 102 and the member 34 can deform simultaneously or can deform in stages. For example, the extension 102 and the member 34 can be designed such that, upon initial rotation of the seat back 28 in forward or rearward rotation, the extension 102 first deforms to absorb energy while the member 34 remains undeformed. If the seat back 28 continues to rotate, the member 34 also deforms to absorb energy. Alternatively, the extension 102 and the member 34 can be designed such that the member 34 initially deforms and the extension 102 subsequently deforms. In any event, the staged deformation allows for both the extension 102 and the member 34 to be tuned to achieve proper energy absorption. Alternatively, the member 34 can deform and the extensions 102 can remain undeformed when the seat back 28 rotates in forward and rearward rotation. In any event, the member 34 and the extension 102 also prevent excessive movement of the seat back 28 in forward rotation and rearward rotation.

Typically, the member 34 is pinned to the extension 102 with the use of a fastener 112, such as a bolt, that extends through holes in the member 34 and the extension 102. However, it should be appreciated that the member 34 can be fixed to the extension 102 in any fashion without departing from the nature of the present invention.

Typically, the member 34 and the extension 102 can be designed such that the seat assembly 20 meets the standards set forth in the Federal Motor Vehicle Safety Standards. The extension 102 can also be designed an optimized by altering the geometry and the material type of the extension 102. For example, the thickness of the extension 102 can be tuned to change the load absorption of the extension 102.

With reference to FIG. 10, the extension 102 can define a bend 114 extending along the extension 102 for altering the rigidity of the extension 102. The bend 114 is typically defined between the fastener and the rod 38.

In the alternative to or in addition to the bend 114, the extension 102 can define one or more dimples 116 to alter the rigidity of the extension 102. For example, the dimples 116 can be defined along the bend 114, as shown in FIG. 10. It should be appreciated that the extension 102 can include other contours and features in addition to or in the alternative to the bend 114 and the dimples 116 to alter the rigidity of the extension 102. Typically, both of the extensions 102 deform as set forth above; however, it should be appreciated that only one of the extensions 102 can deform while the other remains nominally undeformed, as in the case where the extensions 102 are designed with different geometry and are intended to deform sequentially.

The energy absorbing apparatus 110 is relatively lightweight, which is advantageous for assembly and for fuel economy of the vehicle 22. In addition, the energy absorbing apparatus 110 is compact, which is advantageous for packaging of other components of the seat assembly 20, especially below the seat bottom 26. In other words, the member 34 extends from the rod 38 below the seat back 28 and the deformable extension 102 is fixed to the member 34 of the pedestal 30 beneath the seat back 28. The member 34 and the deformable extension 102 are disposed beneath the seat back 28 for avoiding interference with the seat bottom 26 during rotation of the seat bottom 26 between the seating position and the stowed position.

The configuration of the seatbelts in combination with the energy absorbing apparatus 110 and towers 98, 100 cooperate to meet the FMVSS. Generally, the seat assembly 20 is designed to meet the requirements of FMVSS 207 to FMVSS 210, FMVSS 213, FMVSS 222, FMVSS 225, and FMVSS 302. It should be appreciated that the list of FMVSS requirements met is not an exhaustive list and the seat may meet other safety standards.

The invention has been described in an illustrative manner, and it is to be understood that the terminology which has been used is intended to be in the nature of words of description rather than of limitation. Obviously, many modifications and variations of the present invention are possible in light of the above teachings, and the invention may be practiced otherwise than as specifically described.

What is claimed is:

1. A seat assembly for a vehicle, said seat assembly comprising:
    a pedestal for mounting to the vehicle;
    a seat bottom coupled to said pedestal and rotatable about a first axis between a seating position and a stowed position;
    a seat back coupled to said pedestal and rotatable about a second axis spaced from said first axis from an upright position to a forward position in response to a predetermined force from behind said seat back; and
    a deformable extension fixed to and extending between said seat back and said pedestal and configured to deform to absorb energy when said seat back rotates from said upright position to said forward position.

2. The seat assembly as set forth in claim 1 wherein said deformable extension is disposed beneath said seat back for avoiding interference with said seat bottom during rotation of said seat bottom between said seating position and said stowed position.

3. The seat assembly as set forth in claim 2 wherein said deformable extension is fixed to said pedestal beneath said seat back.

4. The seat assembly as set forth in claim 1 wherein said pedestal includes a base and a member extending from said base to said deformable extension with said deformable extension fixed to said member.

5. The seat assembly as set forth in claim 4 wherein said member and said deformable extension are disposed beneath said seat back for avoiding interference with said seat bottom during rotation of said seat bottom between said seating position and said stowed position.

6. The seat assembly as set forth in claim 4 wherein said pedestal includes a second member spaced from said member and extending from said base to said seat bottom beneath said seat bottom.

7. The seat assembly as set forth in claim 1 further comprising a rod extending along said second axis and fixed to said pedestal with said seat back rotatably coupled to said rod.

8. The seat assembly as set forth in claim 7 wherein said pedestal includes a base and a member fixed to and extending from said base to said rod with said deformable extension fixed to said member.

9. The seat assembly as set forth in claim 1 wherein said seat back is rotatable about said second axis from said upright position in a direction away from said forward position to a rearward position in response to a predetermined force from in front of said seat back and wherein said deformable extension is configured to deform to absorb energy when said seat back rotates from said upright position to said rearward position.

10. The seat assembly as set forth in claim 1 wherein said deformable extension defines a bend extending along said deformable extension between said seat back and said pedestal for altering the rigidity of said deformable extension.

11. The seat assembly as set forth in claim 10 wherein said deformable extension defines dimples along said bend.

12. A seat assembly for a vehicle, said seat assembly comprising:
  a seat bottom rotatable about a first axis between a seating position and a stowed position;
  a rod extending along a second axis spaced from said first axis;
  a seat back coupled to said rod and rotatable about said second axis from an upright position to a forward position in response to a predetermined force from behind said seat back;
  a member fixed to and extending from said rod below said seat back; and
  a deformable extension fixed to and extending between said seat back and said member and configured to deform to absorb energy when said seat back rotates from said upright position to said forward position.

13. The seat assembly as set forth in claim 12 wherein said member and said deformable extension are disposed beneath said seat back for avoiding interference with said seat bottom during rotation of said seat bottom between said seating position and said stowed position.

14. The seat assembly as set forth in claim 13 wherein said deformable extension is fixed to said member beneath said seat back.

15. The seat assembly as set forth in claim 12 wherein said member is stationary relative to said seat back when said seat back rotates from said upright position to said forward position.

16. The seat assembly as set forth in claim 12 further including a pedestal having a base for mounting to the vehicle with said member extending from said base to said rod.

17. The seat assembly as set forth in claim 16 wherein said pedestal includes a second member spaced from said member and extending from said base to said seat bottom beneath said seat bottom.

18. The seat assembly as set forth in claim 12 wherein said seat back is rotatable about said second axis from said upright position in a direction away from said forward position to a rearward position in response to a predetermined force from in front of said seat back and wherein said deformable extension is configured to deform to absorb energy when said seat back rotates from said upright position to said rearward position.

19. The seat assembly as set forth in claim 12 wherein said deformable extension defines a bend extending along said deformable extension between said seat back and said pedestal for altering the rigidity of said deformable extension.

20. The seat assembly as set forth in claim 19 wherein said deformable extension defines dimples along said bend.

21. The seat assembly as set forth in claim 12 wherein said deformable extension is spaced about said second axis from said seat back.

22. A seat assembly for a vehicle, said seat assembly comprising:
  a pedestal including an upwardly extending member;
  a seat bottom coupled to said pedestal and rotatable about a first axis between a seating position and a stowed position;
  a seat back coupled to said member of said pedestal and rotatable about a second axis spaced from said first axis, said seat back rotatable from an upright position to a forward position in response to a predetermined force from behind said seat back and rotatable from said upright position in a direction away from said forward position to a rearward position in response to a predetermined force from in front of said seat back; and
  a deformable extension fixed to and extending between said seat back and said member of said pedestal and configured to deform to absorb energy when said seat back rotates from said upright position to said forward position and when said seat back rotates from said upright position to said rearward position;
  wherein said member of said pedestal and said deformable extension are disposed beneath said seat back for avoiding interference with said seat bottom during rotation of said seat bottom between said seating position and said stowed position.

23. The seat assembly as set forth in claim 22 wherein said deformable extension is fixed to said member of said pedestal beneath said seat back.

24. The seat assembly as set forth in claim 22 further comprising a rod extending along said second axis with said member of said pedestal fixed to and extending between said base of said pedestal to said rod and with said seat back rotatably coupled to said rod.

* * * * *